US012124480B2

(12) United States Patent
Gupta et al.

(10) Patent No.: US 12,124,480 B2
(45) Date of Patent: Oct. 22, 2024

(54) SIMPLIFIED SCHEMA GENERATION FOR DATA INGESTION

(71) Applicant: Schlumberger Technology Corporation, Sugar Land, TX (US)

(72) Inventors: Rishabh Gupta, Pune (IN); Dinakar Gollapinni, Telangana (IN); Tharunya Danabal, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 128 days.

(21) Appl. No.: 18/060,136

(22) Filed: Nov. 30, 2022

(65) Prior Publication Data

US 2024/0176803 A1     May 30, 2024

(51) Int. Cl.
*G06F 16/00*     (2019.01)
*G06F 16/21*     (2019.01)
*G06F 16/28*     (2019.01)

(52) U.S. Cl.
CPC .......... *G06F 16/285* (2019.01); *G06F 16/211* (2019.01)

(58) Field of Classification Search
CPC ..................................................... G06F 16/285
USPC ........................................................ 707/738
See application file for complete search history.

(56) References Cited

U.S. PATENT DOCUMENTS

2017/0286456 A1* 10/2017 Wenzel .................. G16H 10/20
                                                                           707/707

* cited by examiner

*Primary Examiner* — Alexandria Y Bromell
(74) *Attorney, Agent, or Firm* — Jeffrey D. Frantz

(57) ABSTRACT

A dataset is received from a data source. A first plurality of string similarities between metadata of the dataset with a plurality of attributes of a plurality of data classes in a target schema are calculated to determine a data class. A set of relationships are assigned to the data class based on relationships between the plurality of data classes in the target schema. A second plurality of string similarities between a plurality of attributes of the dataset and a plurality of attributes of the data class are calculated. Datatypes and measurement units are assigned to the plurality of attributes of the dataset according to the second plurality of string similarities. A source schema is generated based on the data class, the set of relationships, the plurality of attributes of the data class and the measurement units.

18 Claims, 7 Drawing Sheets

400

| Class | Attribute Name | Property | Type | Required | Source | Natural Key |
|---|---|---|---|---|---|---|
| Well | Country | NA | String | No | ProSource | |
| Well | Operator | NA | String | No | ProSource | |
| Well | Permanent_Elevation | Length | Number | No | ProSource | |
| Well | API | NA | String | Yes | OW | Y |
| Well | Depth | NA | Number | No | OW | |
| Wellbore | | | | | ProSource | |
| Wellbore | | | | | OW | |
| Markers | | | | | OW | |

| Class | Source | Tokenized Sentence |
|---|---|---|
| Well | ProSource | Country Operator Permanent_Elevation |
| Well | OW | API Depth |
| Wellbore | ProSource | |
| Wellbore | OW | |

*FIG. 5*

| Class | Source | Tokenized Sentence | Cosine Similarity |
|---|---|---|---|
| Well | ProSource | Country Operator Permanent_Elevation | 0.9 |
| Well | OW | API Depth | 0.85 |
| Wellbore | ProSource | | 0.7 |
| Wellbore | OW | | 0.65 |

*FIG. 6*

| Source Class | Target Class |
|---|---|
| Well | Wellbore |
| Well | Field |
| Well | Elevation Reference |

*FIG. 7*

| Property | Unit System | Unit |
|---|---|---|
| Pressure | SI | kPa |
| Temperature | SI | degC |
| Length | SI | m |

*FIG. 8*

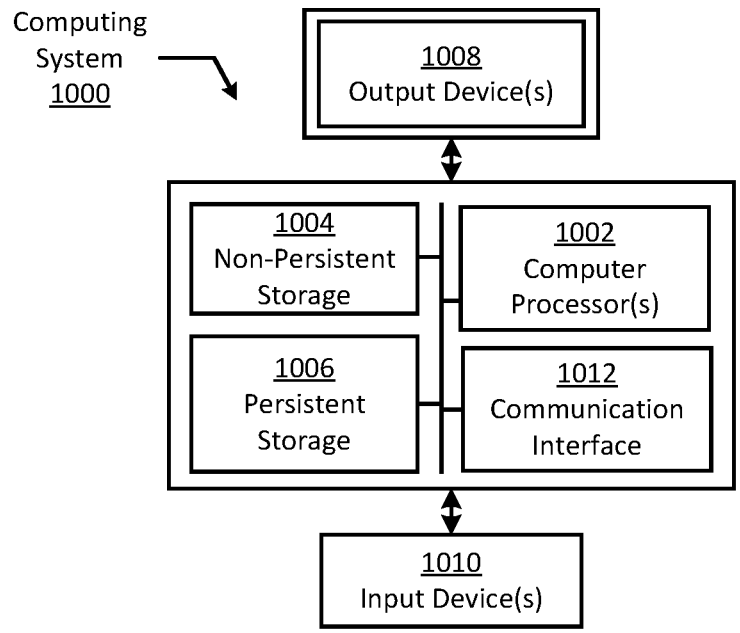
*FIG. 10.1*
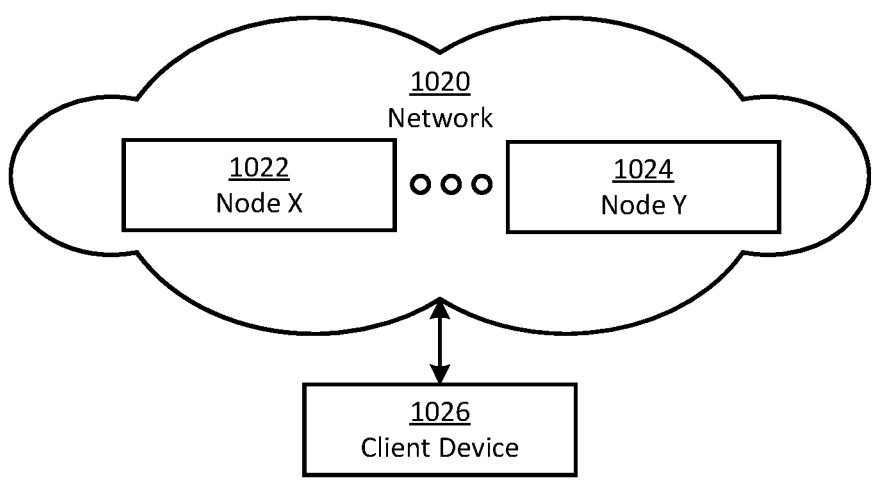
*FIG. 10.2*

SIMPLIFIED SCHEMA GENERATION FOR DATA INGESTION

BACKGROUND

Data is often generated from a variety of sources for clients that need to remain privy to the operational aspects of their services. When data is not consistent or inaccessible, decisions made by such clients may not be the most well-informed, potentially resulting in operational inefficiencies as information is not accessible in a timely manner.

SUMMARY

In general, in one aspect, one or more examples relate to a method that includes receiving a dataset from a data source. The method further includes calculating a first plurality of string similarities between metadata of the dataset with a plurality of attributes of a plurality of data classes in a target schema to determine a data class. The method further includes assigning a set of relationships to the data class based on relationships between the plurality of data classes in the target schema. The method further includes calculating a second plurality of string similarities between a plurality of attributes of the dataset and a plurality of attributes of the data class. The method further includes assigning datatypes and measurement units to the plurality of attributes of the dataset according to the second plurality of string similarities. The method further includes generating a source schema based on the data class, the set of relationships, the plurality of attributes of the data class and the measurement units.

Other aspects of the technology will be apparent from the following description and the appended claims.

BRIEF DESCRIPTION OF DRAWINGS

FIG. 4 shows a collection of metadata that describes a particular dataset in accordance with one or more examples.

FIG. 5 shows an example of tokenized attributes from various data sources in accordance with one or more examples.

FIG. 6 shows an example table that compares tokenized attributes in accordance with one or more examples.

FIG. 7 shows an example reference table of delineated relationships among data classes in accordance with one or more examples.

FIG. 8 shows an example reference table for determination of measurement units in accordance with one or more examples.

FIGS. 10.1 and 10.2 show a computing system in accordance with one or more examples.

DETAILED DESCRIPTION

Figure 1:
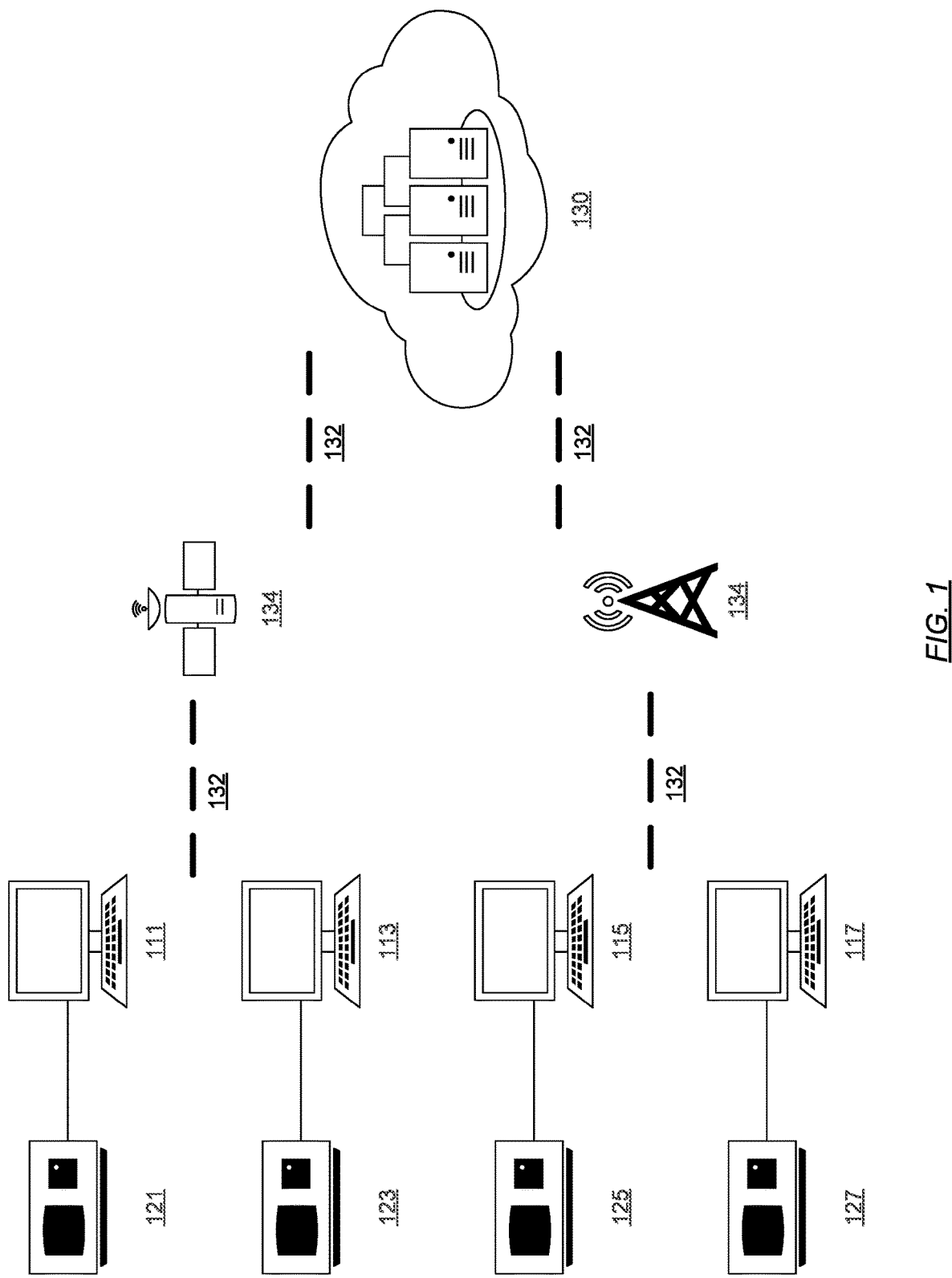
FIG. 1 depicts a schematic view of a cloud-based data sharing environment in which one or more examples may be implemented.

Specific examples will now be described in detail with reference to the accompanying figures. Like elements in the various figures are denoted by like reference numerals for consistency.

In the following detailed description of examples, numerous specific details are set forth in order to provide a more thorough understanding. However, it will be apparent to one of ordinary skill in the art that examples may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Components of a framework may be modeled as Representational State Transfer (RESTful) services and include foundation services, development services, and data services. Various software applications use the services to perform business or domain operations. Software applications, both internal and external, have access to the foundation services, development services, and data services through an application programming interface (API) gateway.

The foundation services, for example, target contract management, cloud security, traffic management, notifications, task management, and offers a portal for the framework. Development services offer a suite of services to run the framework as platform agnostic serverless cloud services, spin up virtual machines with preloaded software, and support three-dimensional (3D) data visualization. Data services offer data ingestion, consumption, management along with an automated data curation framework for software applications.

A problem exists in designing a common data platform that enables consolidating data to one location. Data consolidation can both reduce costs and break down data silos, thereby enabling innovation. However, transitioning existing and new data to a common data platform should account for the different domain data in data models used by various different data sources. Data consolidation without loss of fidelity is a major challenge in this transition.

For example, there are numerous data types in the E&P industry that use ASCII format, such as well tops, horizons, point data, faults sticks, etc. Each data source can have its own data model definitions for storing these data types in their applications. Schemas of each data type have different constraints to ensure data integrity.

In general, examples are directed to improving the accuracy and efficiency of a computer system when generating schemas for ingesting data into a common data platform. One or more examples provide solutions to automate the generation of compliant schemas and file metadata for a common data platform. By analyzing and transforming the structure and properties of data being ingested, including universal identifiers (UIDs), relationships with other data types, property of data attributes (units etc.), nature of data (if the data is spatial) etc.), one or more examples can automatically create a schema dynamically and in real-time that is suitable for ingestion of the data onto the common data platform.

More specifically, one or more examples utilize a prepared training dataset that contains the possible data types for a platform domain, and a list of the attributes that each possible data type can have. To create a schema for new data, a data file is taken as an input. Header information is extracted from the data file, and then compared with the training dataset to automatically determine a datatype for the ingested data. Based on the determined data type, relationships between the datatype and other datatypes are deduced. For example, the relationships may be deduced using a lookup configuration file that stores the possible relationships that datatypes can have with each other. To determine a natural key of the data, the data is analyzed to identify matching combinations of unique values in the key. Once components of schema are determined, the schema can be generated automatically by combining the generated outputs.

FIG. 1 depicts a cloud-based data sharing environment in which one or more examples may be implemented. In one or more examples, one or more of the modules and elements shown in FIG. 1 may be omitted, repeated, and/or substituted. Accordingly, examples should not be considered limited to the specific arrangement of modules shown in FIG. 1.

As shown in FIG. 1, the data sharing environment includes remote systems (111), (113), (115), (117), data acquisition tools (121), (123), (125), (127), and a data platform (130) connected to the data acquisition tools (121), (123), (125), (127), through communication links (132) managed by a communication relay (134).

In one or more examples, data acquisition tools (121), (123), (125), (127), are configured for collecting data. In particular, various data acquisition tools are adapted to measure and detect the physical properties of physical objects and structures. Other data may also be collected, such as historical data, analyst user inputs, economic information, and/or other measurement data and other parameters of interest.

In one or more examples, the remote systems (111), (113), (115), (117) are operatively coupled to the data acquisition tools (121), (123), (125), (127), and in particular, may configured to send commands to the data acquisition tools and to receive data therefrom. The remote systems (111), (113), (115), (117) may therefore be provided with computer facilities for receiving, storing, processing, and/or analyzing data from the data acquisition tools. In one or more examples, the remote systems may also be provided with, or have functionality for actuating, mechanisms of the data acquisition tools (121), (123), (125), (127). A data acquisition tool may be located in a physical location that differs from that of the remote system. As an example, a location may be a processing facility location, a data center location (e.g., server farm, etc.), an oil rig location, a wellsite location, a wind farm, a solar farm, etc. In one or more examples, the remote systems may then send command signals in response to data received, stored, processed, and/or analyzed, for example, to control and/or optimize various operations of the data acquisition tools.

In one or more examples, the remote systems (111), (113), (115), (117) are communicatively coupled to the data platform (130) via the communication links (132). In one or more examples, the communication between the remote systems and the data platform may be managed through a communication relay (134). For example, a satellite, tower antenna or any other type of communication relay may be used to gather data from multiple remote systems and transfer the data to a remote data platform for further analysis. In one or more examples, the data platform is a system configured to analyze, model, control, optimize, or perform management tasks of field operations based on the data provided from the remote systems. In one or more examples, the data platform (130) is provided with functionality for manipulating and analyzing the data. In one or more examples, the results generated by the data platform may be displayed for users to view the results in a two-dimensional (2D) display, three-dimensional (3D) display, or other suitable displays. Although the remote systems are shown as separate from the data platform in FIG. 1, in other examples, the remote systems and the data platform may also be combined.

In one or more examples, the data platform (130) is implemented by deploying applications in a cloud-based infrastructure. As an example, the applications may include a web application that is implemented and deployed on the cloud and is accessible from a browser. Users (e.g., external clients of third parties and internal clients of to the data platform) may log into the applications and execute the functionality provided by the applications to analyze and interpret data, including the data from the remote systems (111), (113), (115), (117). The data platform (130) may correspond to a computing system, such as the computing system shown in FIGS. 10.1 and 10.2 and described below.

Figure 2:
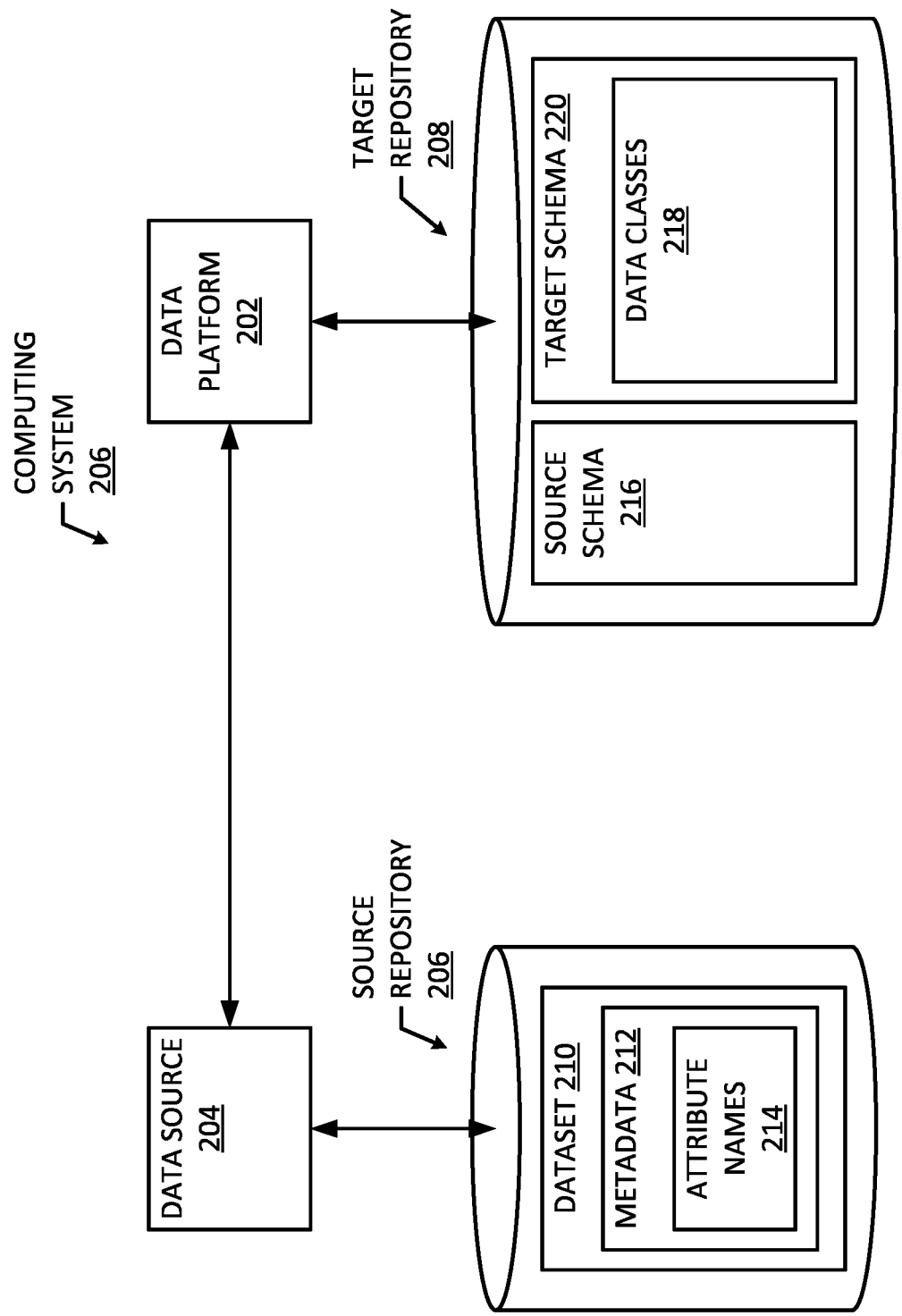
FIG. 2 shows a computer system in accordance with one or more examples.

FIG. 2 shows a computing system (200) for implementing a data platform, which may be the same as data platform (130) in FIG. 1. The hardware components of computing system (200) are described in further detail below and in FIGS. 10.1 and 10.2. The computing system includes a data platform (202), a data source (204), a source repository (206), and a target repository (208).

The data platform (202) is a standards-based data platform defined by a standard set of APIs and a standard set of data models for managing large, disconnected datasets in the platform. The data platform (202) can be a performant consumption layer for the data sources.

The data source (204) is an application program that includes services for analyzing and storing data (e.g., exploration and production data from an energy industry location) in one or more source repository (206). The data source (204) may correspond to sensors, measurement tools, external databases, or websites. The data source (204) can be a computing application running on cloud-based server computers that delivers computing services and solutions to businesses and individuals, and outputting application-generated data for storage in the source repository (206).

The services and solutions of the data source (204) may include hardware, software, infrastructure, etc., that is virtual or physical. In one or more examples, customers access cloud resources through the Internet and are billed for resources and services used according to a subscribed billing method. Cloud providers may provide various solutions, including infrastructure as a service (IaaS), Platform as a service (PaaS), software as a service (SaaS), backend as a service (BaaS), serverless computing, function as a service (FaaS), etc.

In one or more examples, the source repository (206) is a storage unit and/or device (e.g., a file system, database, collection of tables, or any other storage mechanism) for storing data. The source repository (206) may be characterized as a non-transitory computer readable storage medium. The storage of data may be permanent, semi-permanent, or temporary. The source repository (206) may further include multiple different storage units and/or devices. The multiple different storage units and/or devices may or may not be of the same type or located at the same physical site.

The source repository (206) may store, at least temporarily, data used in one or more examples. For example, the source repository (206) may store a dataset (210). As used herein, a "dataset" is a collection of data from a data source that is stored in the source repository. The dataset (210) can be for example, a file, a collection of files, or a batch record that is generated by data source (204). To ensure data integrity, data source (204) may have unique schemas, data model definitions, data constraints and metadata (212) for generating and storing dataset (210) of a particular data type.

Metadata (212) is information describing the dataset (210) that is stored in the source repository (206). The metadata (212) can include business rules and constraints, for example, relationships between datatypes, data attributes, and associated units for the datatypes, as well as references to other data.

In one or more examples, metadata (212) includes one or more attribute names (214). As used herein, an attribute name is a single-value descriptor for a data point or the entire dataset (210). Attribute name corresponds to the standard definition used in the art as defining the property of the real or virtual object that the corresponding attribute value represents. For example, the attribute name may correspond to a column of attribute values in a data table. Attribute names (214) can have corresponding datatypes such as dates, strings, Booleans, and numerical values. In some database management systems, an attribute may sometimes be referred to as a field.

The target repository (208) stores data for use by data platform (202). In one or more examples, the target repository (208) is a storage unit and/or device (e.g., a file system, database, collection of tables, or any other storage mechanism) for storing data. The source repository (206) may be characterized as a non-transitory computer readable storage medium. The storage of data may be permanent, semi-permanent, or temporary. The source repository (206) may include multiple different storage units and/or devices. The multiple different storage units and/or devices may or may not be of the same type or located at the same physical site.

The target repository (208) stores data according to a target schema (220). As used herein, the term "schema" corresponds to the standard definition used in the art as defining the structured framework of a database system, described in a formal language that is supported by the database management system (DBMS). The schema defines the tables, fields, and relationships for accessing and interpreting different types of data stored in a database.

The target schema (220) is a schema used by the data platform (202) to store data in the target repository (208). The target schema (220) enables indexing and normalization of data stored within the target repository (208), as well as consumption of the data by consumer applications.

In one or more examples, target schema (220) can be defined in a standard JavaScript object notation (JSON) object. The target schema (220) may have a nested and complex structure that includes multiple components, such as:
    x_platform_schema_source
      x_platform_license
      id
      schema
      title
      description
      type
      definitions
      properties
      required
      Additional_Properties
      x_platform_inheriting_from_kind The "properties" section of the schema broadly consists of data types of the attributes present in the data, a set of natural key attributes in the data, and relationship of the data with other data types.

In one or more examples, source schema (216) is a schema that is automatically generated for a dataset (210) based at least in part on properties that are automatically identified from metadata (212) of the data set (210). The source schema (216) may be used to ingest data onto the data platform (202). As a result of the schema generation, data loading and migration to the data platform become much simpler.

To generate schemas automatically, the examples described herein automatically identify these properties, creating a new schema to load data of various format can be automatically ingested into the data platform (202). Schemas are generated automatically for the different data types before ingestion into the common data platform. The source schema (216) preserves properties defined in the properties of metadata (212), thereby enabling the fidelity of dataset (210) to be maintained during migration to the data platform (202).

In one or more examples, the computer system (200) applies analyses and transformations (e.g., pipelines) to the dataset (210) submitted to the data platform (202). By analyzing the structure and properties of the dataset (210), including unique identifiers, data type relationships, data attributes and characteristics, the system can dynamically create in real-time a suitable source schema (216), enabling data platform (202) to consume and map the dataset (210) to the data classes (218) of the target schema (220) without manual intervention that interrupts ingestion of the dataset (210).

Figure 3:
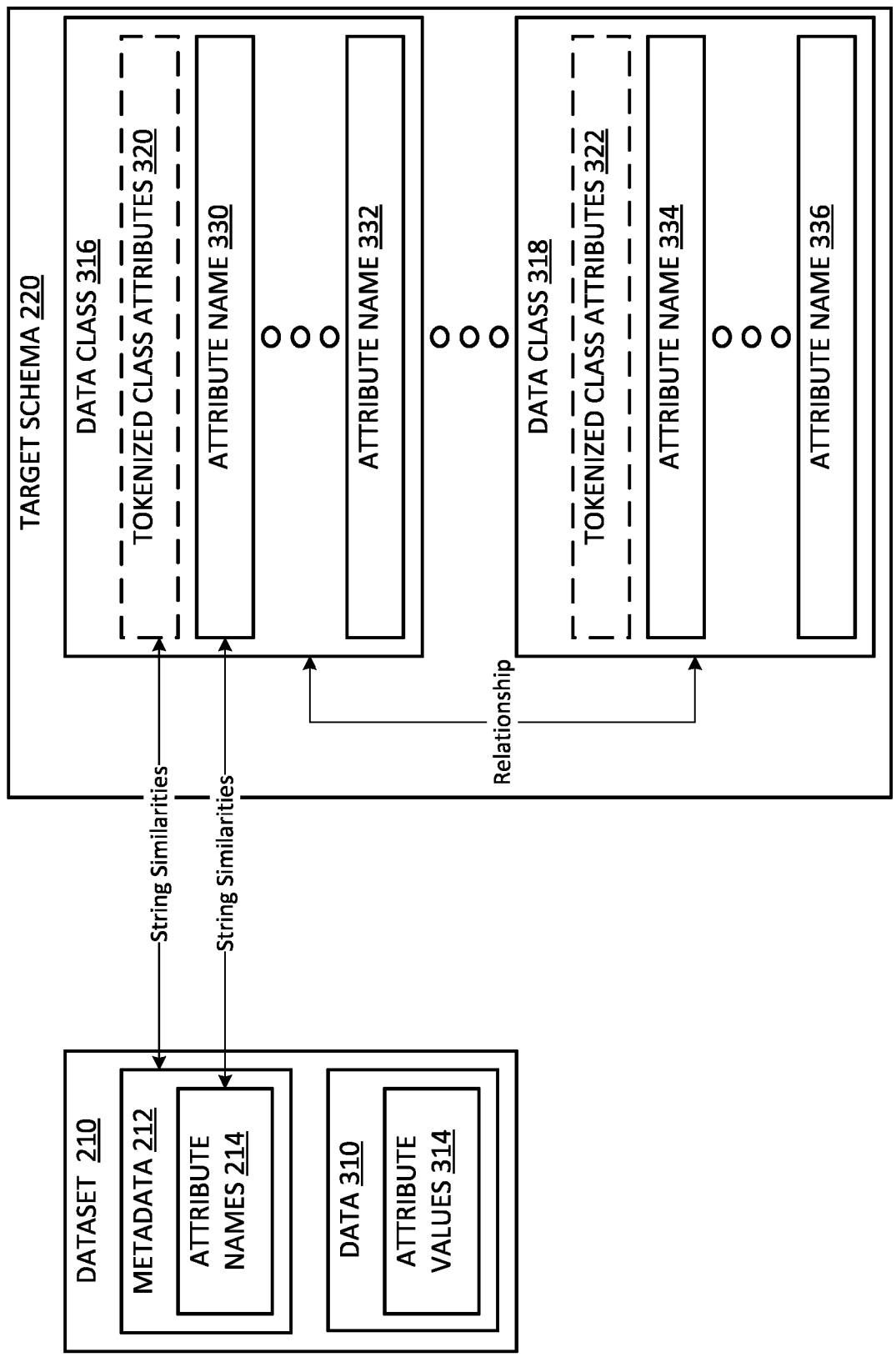
FIG. 3 shows a shows schematic representation of mappings in accordance with one or more examples.

FIG. 3 shows schematic representation of mappings between dataset (210) to a target schema (220). The mappings illustrated in FIG. 3 can be used to generate the source schema (216) of FIG. 2.

Data sources can exist in different silos. For example, one service provider may have multiple data sources that store data in a landmark data catalog, while a different service provider may store data in another data catalog according to a different source schema. In order to consolidate and use these different datasets within data platform (202), datasets (210) stored according to the various source schema (216) should be adapted to the target schema (220) of data platform (202). In other words, in order to migrate properly the dataset (210) to data platform (202), the incoming data should be defined by a source schema (216) that is compliant with platform standards. Compliance with the source schema ensures that ingested data remains accessible to the applications that may consume the datasets from the data platform.

Each dataset may include attributes for the different types of data that are gathered from various data sources. An example of a structure of a dataset storing information about attributes of various classes from different sources is illustrated in FIG. 4.

In one or more examples, dataset (210) includes metadata (212) and data (310). Metadata (212) is information describing the data (310), which is the attribute values (314). Metadata (212) may be recorded in a file header, or in a configuration file. The incoming dataset is defined by a source schema that has various different components, such as attribute names (214), measurement units, and datatypes, for example string, double, etc., that define the attribute values (314) of the incoming data (310) as well as measurement units for the data attributes. Taken alone or in combination, the attribute names (214) of metadata (212) can act as unique or semi-unique identifiers, to align the incoming dataset (210) with data classes of the target schema (220).

Target schema (220) includes data classes (316), (318). As used herein, the term "data class" refers to a type of data, as opposed to a datatype. The data class may relate to a source of the data or real-world object or event that is modeled by the data. For example, within the E&P industry, there are numerous data types such as well tops, horizons, point data, faults sticks, etc. One or more of these data types may use an ASCII format. The target schema may contain multiple classes, with each class corresponding to a type of data.

Tokenized class attributes (320), (322) are tokenized sentences concatenated from the attribute names (330), (332) and (334), (336) of data classes (316), (318), respectively. For example, tokenized class attributes (320) are a concatenated one-sentence representations of attribute names (330), (332). Tokenized class attributes (322) are each a concatenated one-sentence representation of attribute names (334), (336).

Tokenized class attributes (320), (322) can be used to determine a data class for incoming dataset (210), for example, by comparing an amalgamation of attribute names (214) to the tokenized class attributes for data classes (316), (318). Attribute names (214) can be parsed from metadata (212) and concatenated into a one-sentence representation of metadata (212). This representation can then be compared to the tokenized class attributes of various data classes of the target schema (220) using one or more string similarity algorithms. Attribute names (214) can be parsed from metadata (212) and concatenated into a one-sentence representation of metadata (212). This representation can then be compared to the tokenized class attributes of various data classes of the target schema (220) using one or more string similarity algorithms.

Referring now to FIG. 4, a structure of a dataset is depicted for storing information about attributes of various classes from different sources. The data structure (400) of FIG. 4 is a collection of metadata that describes a particular dataset for data storage in a data platform such as data platform (202). FIG. 4 shows the properties that are included in the datasets. Each row of FIG. 4 is for a particular attribute of a data class. For example, the first column is the identifier of a class, the second column indicates an attribute name, the third column provides a description of the property, the fourth column indicates a datatype of the attribute, the fifth column indicates whether the attribute is required to be included in the data class, the sixth column indicates a source of the data, and the seventh column specifies whether the attribute can be used as a natural key. Taken together, the specification of FIG. 4 describes the data attributes of a dataset that is stored in the data platform.

Referring now to FIG. 5 an example of tokenized attributes from various data sources is depicted. The data structure (500) of FIG. 5 depicts tokenized sentences concatenated from the attribute names extracted from the data structure shown in FIG. 4. Each row of FIG. 5 is for a combination of data class and data source. For example, the tokenized sentence "country operator permanent_elevation" is a concatenation of the attribute names for the Combination of class "well" and source "prosource"; and the tokenized sentence "API depth" that is a concatenation of the attribute names for the Combination of class "well" and source "OW." The tokenized sentences illustrated in FIG. 5 are used to identify a data class for an incoming dataset, for example using a string similarity metric.

Referring now to FIG. 6 an example of data classes in a target schema is depicted that relating tokenized attributes across various sources of a new dataset. The data structure (600) of FIG. 6 depicts tokenized class attributes created from the grouped attributes names of a target schema. The attributes names are grouped according to both data class and data source of the target schema. The cosine similarity indicated in the fourth column is a string similarity calculated between the tokenized sentence depicted in the third column, and the tokenized sentence of an incoming data set, such as illustrated in FIG. 5. The cosine similarities illustrated in FIG. 6 are used to identify a data class for an incoming dataset, for example, using a highest median cosine similarity.

Referring now to FIG. 7, an example data structure is depicted matching data classes of a source schema to a target schema. For example, the data structure (700) of FIG. 7 illustrates possible matchings from the data class "well" of a source schema to the data classes "well bore," "field," and "elevation reference" of a target schema. Based on the sentence similarity determination, attributes of source data most closely matching the target class name can be used as a foreign key for mapping to the related entity.

Figure 9:
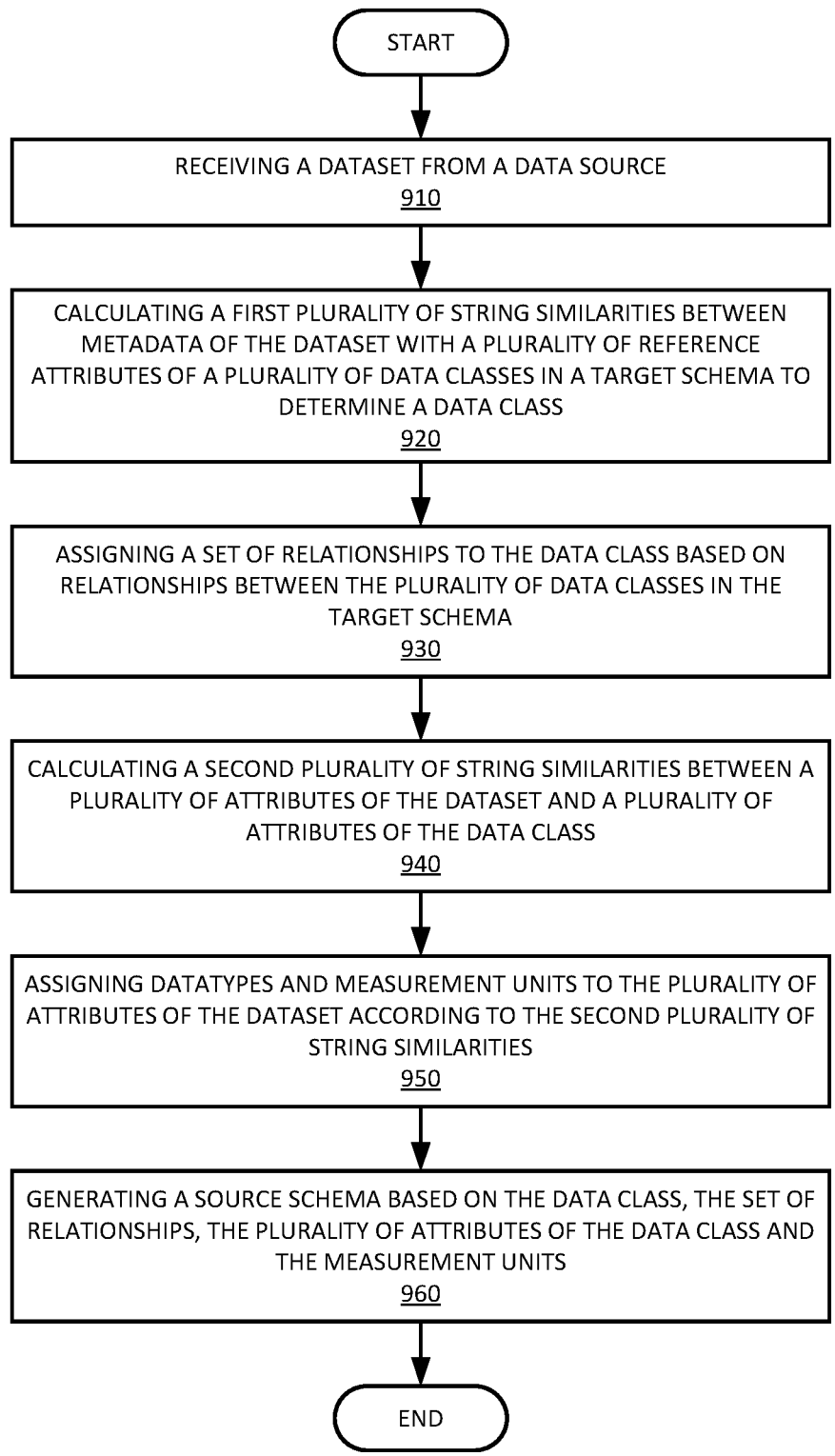
FIG. 9 shows a flowchart in accordance with one or more examples.

Referring now to FIG. 8, an example data structure is depicted for determination of measurement units. The data structure (800) of FIG. 8 illustrates attribute names with the corresponding measurement units used in a measurement system. Each row of FIG. 8 is for an attribute name of an incoming dataset. Based on the property of the attribute, the data structure (800) provides a lookup table to reference the unit of the data FIG. 9 shows a flowchart in accordance with one or more examples. One or more blocks shown in FIG. 9 may be combined, omitted, repeated, and/or performed in a different order among different examples. Accordingly, examples should not be considered limited to the specific number and arrangement of blocks shown in FIG. 9. FIG. 9 provides a general overview of one or more examples.

In block (910), a dataset is received from a data source in accordance with one or more examples. In one or more illustrative examples, the dataset can be received from an application deployed outside of the data platform. The application may access the data platform through a set of RESTful APIs.

During ingestion, the data and measurement units of the incoming dataset are read. For example, metadata contained in a header or configuration file is read and extracted.

In block (920), a first plurality of string similarities is calculated between metadata of the dataset and a plurality of attributes of a plurality of data classes in a target schema to determine a data class.

For example, using various string similarity algorithms, the metadata can be aligned with one or more data classes of a target schema at both and amalgamated and individual granularities. To determine the data type, sentence similarity algorithms can be used to find the closest match between the data classes of the target schema and one or more attribute names of an attribute in the dataset. The attributes are grouped according to class and source from the dataset. The attribute names read from the header are tokenized and appended to create a one sentence string containing a concatenation of the attributes, separated by spaces. An example of the tokenized attributes from various sources of FIG. 4 are shown in FIG. 5.

Thus, the string similarity may automatically determine a class of new data for which the schema must be created. For example, the sentence similarity algorithms may include cosine similarity, Jaccard similarity, Euclidean distance etc., which can be used interchangeably and in combination. The sentence similarity algorithms determine the string similarities, and the closest match is assigned to the incoming dataset.

In one or more illustrative examples, calculating the plurality of string similarities can include using extracted attribute names from the metadata of the dataset that were extracted in block 910. A first tokenized sentence is generated from the attribute names extracted from the metadata of the dataset. A plurality of second tokenized sentences is generated from attribute names of the plurality of attributes of a plurality of data classes. The first plurality of string similarities is calculated between the first tokenized sentence and the plurality of second tokenized sentences. The data class is assigned for the dataset according to a most similar one of the first plurality of string similarities. Thus, the dataset is matched with data classes of the target schema according to the alignment of the attributes of the dataset with attributes for the data classes of the target schema.

For example, a cosine similarity can be calculated for new sentence and each grouped sentence. An example of the cosine similarity between tokenized attributes from various sources and new data is shown at FIG. 6. A median cosine similarity of each class is taken and class with highest median cosine similarity is considered as actual data type for new data. A median similarity may be preferred as it helps to eliminate outliers. However, a mean similarity can also be used in other examples.

In one or more illustrative examples, calculating the first plurality of string similarities can include extracting attribute names from the metadata of the dataset. The attribute names extracted from the metadata of the dataset or concatenated to form a first string. A first vector representation is calculated for the first string. The attribute names of the plurality of attributes are concatenated to form a plurality of second strings. A plurality of second vector representations is calculated for the plurality of second strings. The plurality of string similarities is calculated between the first vector representation and the plurality of second vector representations. The data class for the dataset is assigned according to a most similar one of the first plurality of string similarities.

In block (930), a set of relationships is assigned to the data class based on relationships between the plurality of data classes in the target schema. The relationships with other datatypes are delineated for the incoming dataset according to the determined class.

For example, a look up table can be used to delineate relationship of the data type with other datatypes. Relationships for the incoming dataset are defined by locating the determined data class in the look up table and identifying the associated data classes. An example of a reference table to delineate relationships is shown at FIG. 7.

For example, to determine how data is related with other class, the target class name is matched against all the attributes of new data to be loaded. Using an algorithm such as Levenshtein distance, Trigram, word mover etc., a nearest distance is calculated between target classes and all the attributes of new data. The attribute score is used in conjunction with the look up table to create relationships between incoming a dataset and target class. The attributes of the new dataset to be loaded is matched against the various attributes of the data class that was identified, and an edit distance is calculated between target classes and the attributes of new data. Relationships are assigned to the dataset based the matched reference class and the relationships of the matched reference class to other reference classes as defined in the target schema.

In block (940), a second plurality of string similarities is calculated between a plurality of attributes of the dataset and a plurality of attributes of the data class. The process step of block (940) determines data types for each attribute of metadata once the dataset has been matched to a reference class. Thus, the attributes of the dataset are aligned with the attributes of the data classes according to the target schema.

For example, datatypes of the individual attributes can be determined by calculating sentence similarity, for example, using a Levenshtein distance of each attribute in new data against all the attributes of the detected class from various sources. For each source attribute, a highest median similarity is considered to be the possible match amongst all the highest matched attributes from each source the type of the attribute. In the event that the attribute types do not match, the user can select which data type takes precedence and should be assigned to the attribute.

In one or more illustrative examples, the determined data type is verified against the incoming data set. For certainty, the first 100 rows of data can be parsed, and the data types can be determined. The determined type is checked against the type of detected attribute.

In one or more illustrative examples, calculating the second plurality of string similarities can include determining a plurality of edit distances between attribute names of the plurality of attributes of the dataset and attribute names of the plurality of attributes of the data class. The plurality of attributes of the dataset are mapped to the plurality of attributes of the data class according to the plurality of edit distances.

For example, in one or more examples, a string similarity is calculated using an edit distance for each attribute in the dataset against the attributes of the detected class from various sources. The edit distance is a string metric that qualifies a similarity between two strings (e.g., words), measured by counting the minimum number of operations required to transform one string into the other. The edit distance can be, for example, a Levenshtein distance, a Damerau-Levenshtein distance, a longest common subsequence, a Hamming distance, a Jaro distance, or other suitable sequence alignment algorithms.

In block (950), datatypes and measurement units are assigned to the morality of attributes of the dataset according to the second plurality of string similarities.

To determine measurement units for the data attributes, another look up Table can be provided to associate unit measurements with data attributes. Based on the property of the attribute detected in the last step, this lookup table is referenced to identify a measurement unit for the determined data type. Reference table for unit determination is illustrated at FIG. 8.

In one or more illustrative examples, assigning datatypes and measurement units to the plurality of attributes of the dataset can include assigning the data types to the plurality of attributes of the dataset according to the mapping. The measurement units are assigned to the plurality of attributes of the dataset according to the datatypes assigned to the plurality of attributes.

In block (960), the source schema is generated based on the data class, the set of relationships, the plurality of attributes of the data class and the measurement units.

To generate the final schema, a raw schema that is defined according to standards for the particular data platform can be used to ingest data from data source as is in full fidelity. For example, the raw schema may be a JavaScript object notation (JSON) draft standard defined by an open-sourced community of developers for the data platform. The new schema that is created, such as source schema (216) of FIG. 2, conforms to these defined standards to maintain data fidelity and ensure functionalities of the data platform.

For example, to ensure full fidelity of datasets ingested into the data platform, the generated source schemas must account for class determination, determination of datatype of attributes, delineation of relationships with other entities, natural keys in the dataset, and measurement units associated with data. The examples described herein determine these parameters automatically from metadata of the incoming dataset.

In one or more illustrative examples, the source schema is mapped to the target schema of a data platform. The dataset is ingested into the data platform according to the source schema. This mapping can be performed automatically, for example, using a nearest distance algorithm In one or more illustrative examples, ingesting the dataset into the data platform can include parsing the dataset to identify unique combinations among the plurality of attributes. A set of natural keys is determined from the unique combinations. The dataset is indexed within the data platform according to the set of natural keys. In one or more illustrative examples, the dataset is accessed within the data platform according to indexing the dataset within the data platform according to the set of natural keys.

For example, natural keys in the data can be determined directly from indications in the metadata. Alternatively, natural keys of the data can be determined by checking the data attributes for different combinations of attributes that makes the data unique. These combinations can be checked, for example, based on a comparison with a subset of the data in the incoming dataset.

Examples may be implemented on a computing system. Any combination of mobile, desktop, server, router, switch, embedded device, or other types of hardware may be used. For example, as shown in FIG. 10.1, the computing system (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), and numerous other elements and functionalities.

The computer processor(s) (1002) may be an integrated circuit for processing instructions. For example, the computer processor(s) may be one or more cores or micro-cores of a processor. The computing system (1000) may also include one or more input devices (1010), such as a touchscreen, keyboard, mouse, microphone, touchpad, electronic pen, or any other type of input device.

The communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the computing system (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing systems exist, and the aforementioned input and output device(s) may take other forms.

Software instructions in the form of computer readable program code to perform examples may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more examples.

The computing system (1000) in FIG. 10.1 may be connected to or be a part of a network. For example, as shown in FIG. 10.2, the network (1020) may include multiple nodes (e.g., node X (1022), node Y (1024)). Each node may correspond to a computing system, such as the computing system shown in FIG. 10.1, or a group of nodes combined may correspond to the computing system shown in FIG. 10.1. By way of an example, examples may be implemented on a node of a distributed system that is connected to other nodes. By way of another example, examples may be implemented on a distributed computing system having multiple nodes, where each portion may be located on a different node within the distributed computing system. Further, one or more elements of the aforementioned computing system (1000) may be located at a remote location and connected to the other elements over a network.

Although not shown in FIG. 10.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1022), node Y (1024)) in the network (1020) may be configured to provide services for a client device (1026). For example, the nodes may be part of a cloud computing system. The nodes may include functionality to receive requests from the client device (1026) and transmit responses to the client device (1026). The client device (1026) may be a computing system, such as the computing system shown in FIG. 10.1. Further, the client device (1026) may include and/or perform at least a portion of one or more examples.

The computing system or group of computing systems described in FIG. 10.1 and FIG. 10.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope. The processes may be part of the same or different application and may execute on the same or different computing system.

Rather than or in addition to sharing data between processes, the computing system performing one or more examples may include functionality to receive data from a user. For example, in one or more examples, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more examples, may extract one or more data items from the obtained data. For example, the extraction may be performed as follows by the computing system in FIG. 10.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 10.1, while performing one or more examples, may perform data comparison. Data comparison may be used to compare two or more data values (e.g., A, B). For example, one or more examples may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A-B), and the status flags may be read to determine if the result is positive (i.e., if A>B, then A-B>0). In one or more examples, B may be considered a threshold, and A is deemed to satisfy the threshold if A=B or if A>B, as determined using the ALU. In one or more examples, A and B may be vectors, and comparing A with B involves comparing the first element of vector A with the first element of vector B, the second element of vector A with the second element of vector B, etc. In one or more examples, if A and B are strings, the binary values of the strings may be compared.

The computing system in FIG. 10.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 10.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 10.1 and the nodes and/or client device in FIG. 10.2. Other functions may be performed using one or more examples.

While one or more examples have been described with respect to a limited number of examples, those skilled in the art, having benefit of this disclosure, will appreciate that other examples may be devised which do not depart from the scope as disclosed herein. Accordingly, the scope should be limited by the attached claims.

What is claimed is:

1. A method comprising:
receiving a dataset from a data source;
calculating a first plurality of string similarities between metadata of the dataset with a plurality of attributes of a plurality of data classes in a target schema to determine a data class, wherein calculating the first plurality of string similarities comprises:
extracting attribute names from the metadata of the dataset;
generating a first tokenized sentence from the attribute names extracted from the metadata of the dataset;
generating a plurality of second tokenized sentences from attribute names of the plurality of attributes of the plurality of data classes;
calculating the first plurality of string similarities between the first tokenized sentence and the plurality of second tokenized sentences; and
assigning the data class for the dataset according to a most similar one of the first plurality of string similarities;
assigning a set of relationships to the data class based on relationships between the plurality of data classes in the target schema;
calculating a second plurality of string similarities between a plurality of attributes of the dataset and a plurality of attributes of the data class;
assigning datatypes and measurement units to the plurality of attributes of the dataset according to the second plurality of string similarities; and
generating a source schema based on the data class, the set of relationships, the plurality of attributes of the data class and the measurement units.

2. The method of claim 1, wherein calculating the second plurality of string similarities comprises:
determining a plurality of edit distances between attribute names of the plurality of attributes of the dataset and attribute names of the plurality of attributes of the data class; and
mapping the plurality of attributes of the dataset to the plurality of attributes of the data class according to the plurality of edit distances.

3. The method of claim 2, wherein assigning the datatypes and the measurement units to the plurality of attributes of the dataset comprises:
assigning the datatypes to the plurality of attributes of the dataset according to the mapping; and
assigning the measurement units to the plurality of attributes of the dataset according to the datatypes assigned to the plurality of attributes.

4. The method of claim 1, further comprising:
mapping the source schema to the target schema of a data platform; and
ingesting the dataset into the data platform according to the source schema.

5. The method of claim 4, wherein ingesting the dataset into the data platform comprises:
parsing the dataset to identify unique combinations among the plurality of attributes;
determining a set of natural keys from the unique combinations; and
indexing the dataset within the data platform according to the set of natural keys.

6. The method of claim 5, further comprising:
accessing the dataset within the data platform according to indexing the dataset within the data platform according to the set of natural keys.

7. A system comprising:
a computer processor;
memory; and
instructions stored in the memory and executable by the computer processor to cause the computer processor to perform operations, the operations comprising:
receiving a dataset from a data source;
calculating a first plurality of string similarities between metadata of the dataset with a plurality of attributes of a plurality of data classes in a target schema to determine a data class, wherein calculating the first plurality of string similarities comprises:
extracting attribute names from the metadata of the dataset;
generating a first tokenized sentence from the attribute names extracted from the metadata of the dataset;
generating a plurality of second tokenized sentences from attribute names of the plurality of attributes of a plurality of data classes;
calculating the first plurality of string similarities between the first tokenized sentence and the plurality of second tokenized sentences; and
assigning the data class for the dataset according to a most similar one of the first plurality of string similarities;
assigning a set of relationships to the data class based on relationships between the plurality of data classes in the target schema;
calculating a second plurality of string similarities between a plurality of attributes of the dataset and a plurality of attributes of the data class;
assigning datatypes and measurement units to the plurality of attributes of the dataset according to the second plurality of string similarities; and
generating a source schema based on the data class, the set of relationships, the plurality of attributes of the data class and the measurement units.

8. The system of claim 7, wherein calculating the second plurality of string similarities comprises:
determining a plurality of edit distances between attribute names of the plurality of attributes of the dataset and attribute names of the plurality of attributes of the data class; and
mapping the plurality of attributes of the dataset to the plurality of attributes of the data class according to the plurality of edit distances.

9. The system of claim 8, wherein assigning the datatypes and the measurement units to the plurality of attributes of the dataset comprises:
assigning the datatypes to the plurality of attributes of the dataset according to the mapping; and
assigning the measurement units to the plurality of attributes of the dataset according to the datatypes assigned to the plurality of attributes.

10. The system of claim 7, further comprising:
mapping the source schema to the target schema of a data platform; and
ingesting the dataset into the data platform according to the source schema.

11. The system of claim 10, wherein ingesting the dataset into the data platform further comprises:
parsing the dataset to identify unique combinations among the plurality of attributes;
determining a set of natural keys from the unique combinations; and
indexing the dataset within the data platform according to the set of natural keys.

12. The system of claim 11, further comprising:
accessing the dataset within the data platform according to indexing the dataset within the data platform according to the set of natural keys.

13. A computer program product comprising non-transitory computer-readable program code that, when executed by a computer processor of a computing system, causes the computing system to perform the method of:
receiving a dataset from a data source;
calculating a first plurality of string similarities between metadata of the dataset with a plurality of attributes of a plurality of data classes in a target schema to determine a data class, wherein calculating the first plurality of string similarities comprises:
extracting attribute names from the metadata of the dataset;
generating a first tokenized sentence from the attribute names extracted from the metadata of the dataset;
generating a plurality of second tokenized sentences from attribute names of the plurality of attributes of a plurality of data classes;
calculating the first plurality of string similarities between the first tokenized sentence and the plurality of second tokenized sentences; and
assigning the data class for the dataset according to a most similar one of the first plurality of string similarities;
assigning a set of relationships to the data class based on relationships between the plurality of data classes in the target schema;
calculating a second plurality of string similarities between a plurality of attributes of the dataset and a plurality of attributes of the data class;
assigning datatypes and measurement units to the plurality of attributes of the dataset according to the second plurality of string similarities; and
generating a source schema based on the data class, the set of relationships, the plurality of attributes of the data class and the measurement units.

14. The computer program product of claim 13, wherein calculating the second plurality of string similarities comprises:
- determining a plurality of edit distances between attribute names of the plurality of attributes of the dataset and attribute names of the plurality of attributes of the data class; and
- mapping the plurality of attributes of the dataset to the plurality of attributes of the data class according to the plurality of edit distances.

15. The computer program product of claim 14, wherein assigning the datatypes and the measurement units to the plurality of attributes of the dataset comprises:
- assigning the datatypes to the plurality of attributes of the dataset according to the mapping; and
- assigning the measurement units to the plurality of attributes of the dataset according to the datatypes assigned to the plurality of attributes.

16. The computer program product of claim 13, further comprising:
- mapping the source schema to the target schema of a data platform; and
- ingesting the dataset into the data platform according to the source schema.

17. The computer program product of claim 16, wherein ingesting the dataset into the data platform comprises:
- parsing the dataset to identify unique combinations among the plurality of attributes;
- determining a set of natural keys from the unique combinations; and
- indexing the dataset within the data platform according to the set of natural keys.

18. The computer program product of claim 17, further comprising:
- accessing the dataset within the data platform according to indexing the dataset within the data platform according to the set of natural keys.

* * * * *